(12) United States Patent
Pretorius et al.

(10) Patent No.: US 6,199,365 B1
(45) Date of Patent: Mar. 13, 2001

(54) PIEZOELECTRIC CHEMICAL IGNITION DEVICE

(75) Inventors: Jacob van Reenen Pretorius, Cambridge; Marthinus Cornelius van Schoor, Medford, both of MA (US)

(73) Assignee: Mide Technology Corp., Cambridge, MA (US)

( * ) Notice: Subject to any disclaimer, the term of this patent is extended or adjusted under 35 U.S.C. 154(b) by 0 days.

(21) Appl. No.: 09/310,692

(22) Filed: May 7, 1999

Related U.S. Application Data

(63) Continuation-in-part of application No. 09/173,144, filed on Oct. 15, 1998.

(51) Int. Cl.⁷ ............................................. F02C 7/26
(52) U.S. Cl. ................................................... 60/39.06
(58) Field of Search ...................... 60/39.821, 39.827, 60/39.828, 39.06

(56) References Cited

U.S. PATENT DOCUMENTS

| | | | |
|---|---|---|---|
| 3,361,929 | 1/1968 | Vandover | 315/55 |
| 3,957,023 | 5/1976 | Peterson | 123/117 R |
| 3,986,061 * | 10/1976 | Suzuki et al. | 310/9.8 |
| 4,082,985 * | 4/1978 | Bolhuis | 315/241 |
| 4,095,580 | 6/1978 | Murray et al. | 123/32 SJ |
| 4,169,388 | 10/1979 | Teitelbaum et al. | 73/714 |
| 4,190,027 | 2/1980 | Inui et al. | 123/117 R |
| 4,266,427 | 5/1981 | Wesley | 73/119 A |
| 4,412,151 | 10/1983 | Norris | 315/55 |
| 4,508,079 | 4/1985 | Komurasaki et al. | 123/425 |
| 4,601,197 | 7/1986 | Fattic et al. | 73/117.3 |
| 4,622,939 | 11/1986 | Matekunas | 123/425 |
| 4,881,403 | 11/1989 | Kagawa et al. | 73/115 |
| 4,954,078 * | 9/1990 | Nelson | 431/255 |
| 5,022,324 * | 6/1991 | Rice, Jr. | 102/201 |
| 5,291,872 | 3/1994 | Ghaem | 123/620 |
| 5,327,866 | 7/1994 | Kitajima | 123/406 |
| 5,375,585 * | 12/1994 | Home | 126/39 |
| 5,479,817 | 1/1996 | Suzuki et al. | 73/115 |
| 5,536,990 * | 7/1996 | Nelson | 310/339 |
| 5,647,734 * | 7/1997 | Milleron | 417/380 |
| 5,840,062 * | 11/1998 | Gumaste et al. | 604/68 |

* cited by examiner

Primary Examiner—Timothy S. Thorpe
Assistant Examiner—William Rodriguez
(74) Attorney, Agent, or Firm—Choate, Hall & Stewart

(57) ABSTRACT

An igniter that uses the change or fluctuation pressure in a system or process to generate electrical energy by means of a piezoelectric element. This electrical energy is then relayed to an ignition device or devices that ignites combustible liquid or mixture of liquids and gasses or mixtures of gasses. The ignition can take place either in the systems combustion chamber, or, in the case of burn off of excess gasses/fluids, at the systems vent.

13 Claims, 4 Drawing Sheets

PIEZOELECTRIC CHEMICAL IGNITION DEVICE

This application is a continuation-in-part of U.S. patent application Ser. No. 09/173,144, filed Oct. 15, 1998, which is incorporated herein by reference.

FIELD OF THE INVENTION

This invention relates to a piezoelectric ignition device for a combustion system and more particularly to a device wherein the piezoelectric element is responsive to changes of pressure in the combustion system.

BACKGROUND OF THE INVENTION

Many combustion processes require either pilot flames or complicated controllers to control ignition and combustion. For example, a gas stove requires either a pilot light or an electric starter. Complex electronics control intermittent spark release in a gas turbine engine to regulate the stability of combustion. While piezoelectric materials have been developed for a variety of ignition systems, in most cases, generation of a voltage across the materials has been controlled almost independently of the flow of the material to be ignited.

For example, Home, in U.S. Pat. No. 5,375,585, teaches a piezoelectric igniter and safety valve for a gas stove. However, the safety valve is controlled by a thermocouple. The igniter is controlled by a knob connected to a valve and a metal striker. As the knob is turned, it first opens the valve, allowing gas to flow, and then causes the striker to hit a piezoelectric element. A voltage is produced across the piezoelectric element, which is then conducted to an electrode, whereat a spark is produced which ignites the gas. A similar process is disclosed by Nelson in U.S. Pat. No. 4,954,078. Nelson discloses an igniter for a propane torch or like device, wherein the igniter is contained within the torch. A valve is opened to permit gas flow, and a trigger is pressed to actuate a spring-loaded plunger which impacts a piezoelectric element. Suzuki, in U.S. Pat. No. 3,986,061, describes an ignition system for cigarette lighters and similar devices in which voltage is generated across a piezoelectric element in response to a bending stress. Again, this voltage is eventually used to generate a spark and ignite a combustible material.

Nelson, in U.S. Pat. No. 5,536,990, describes a system in which one combustion process initiates a subsequent process. The first process includes a detonation which impacts a piezoelectric element. The voltage generated across the element is used to initiate a second process.

SUMMARY OF THE INVENTION

The invention comprises an igniter that is activated by the fluctuation of the pressure in some part of a combustion system or process. The igniter exploits the piezoelectric properties of an element to generate the voltage, charge, and energy required for ignition in response to the pressure in the system or process. The piezoelectric element generates electrical energy in response to the mechanical energy supplied by the fluctuation in pressure in a certain part of the system or process. The electrical energy generated by the element is relayed to the combustion chamber of the system or process, where it can initiate or sustain combustion of liquids or gases. Ignition is thus achieved in response to the change in pressure in some part of the system or process.

In one aspect, this invention comprises an ignition device for a combustion system containing a piezoelectric element which can generate electrical energy in response to pressure. The electrical energy generated is sufficient to ignite a combustible material. The combustible material may comprise a liquid or plurality of liquids, a gas or plurality of gases, or a mixture of liquids and gases. For example, the system may ignite a chemical combustion process, turbine engines, or a propellant for space propulsion. A combustible material is introduced by means whereby a change in the amount of the material being introduced results in a change in pressure exerted on the piezoelectric element. This invention also comprises a piezoelectric element which, in response to pressure, generates enough electrical energy to ignite a combustible material. The piezoelectric element is electrically coupled to an igniter. The invention may further comprise a switch and a controller, which, by opening and closing the switch, controls the conduction of electrical energy from the piezoelectric element to the igniter. In addition, the invention may further comprise a capacitor, enabling ignition delay, or the ignition delay capability may be included in the controller.

This invention also comprises a combustion process comprising a feedline for introduction of a combustible material and means to increase the pressure on a piezoelectric element in response to the introduction of that material. In response to the increased pressure, the piezoelectric element generates enough electrical energy to ignite the combustible material. The invention also comprises means for conducting the electrical energy to an igniter whereat the combustible material is ignited.

The invention also comprises a method of igniting a combustible material. Material is introduced from a reservoir, resulting in a change in pressure applied to a piezoelectric element. In response, the piezoelectric element generates electrical energy sufficient to ignite the material, which is conducted to an igniter to ignite the combustible material. The invention may further comprise controlling the conduction of the electrical energy to the igniter.

DETAILED DESCRIPTION

The piezoelectric chemical ignition device of the invention relies on the piezoelectric effect for operation. This effect was discovered about a century ago and has been defined as polarization of electrical charge produced by mechanical strain, the polarization being roughly proportional to the amount of strain.

The fluctuation of pressure in a system or process is used as the mechanical force that strains the piezoelectric element. This fluctuation of strain causes a voltage to be generated over the poles of the piezoelectric element. The piezoelectric element converts mechanical energy (pressure) into electrical energy (potential and charge). This electrical energy is used in systems and processes for ignition and combustion of liquids and gases.

Figure 1:
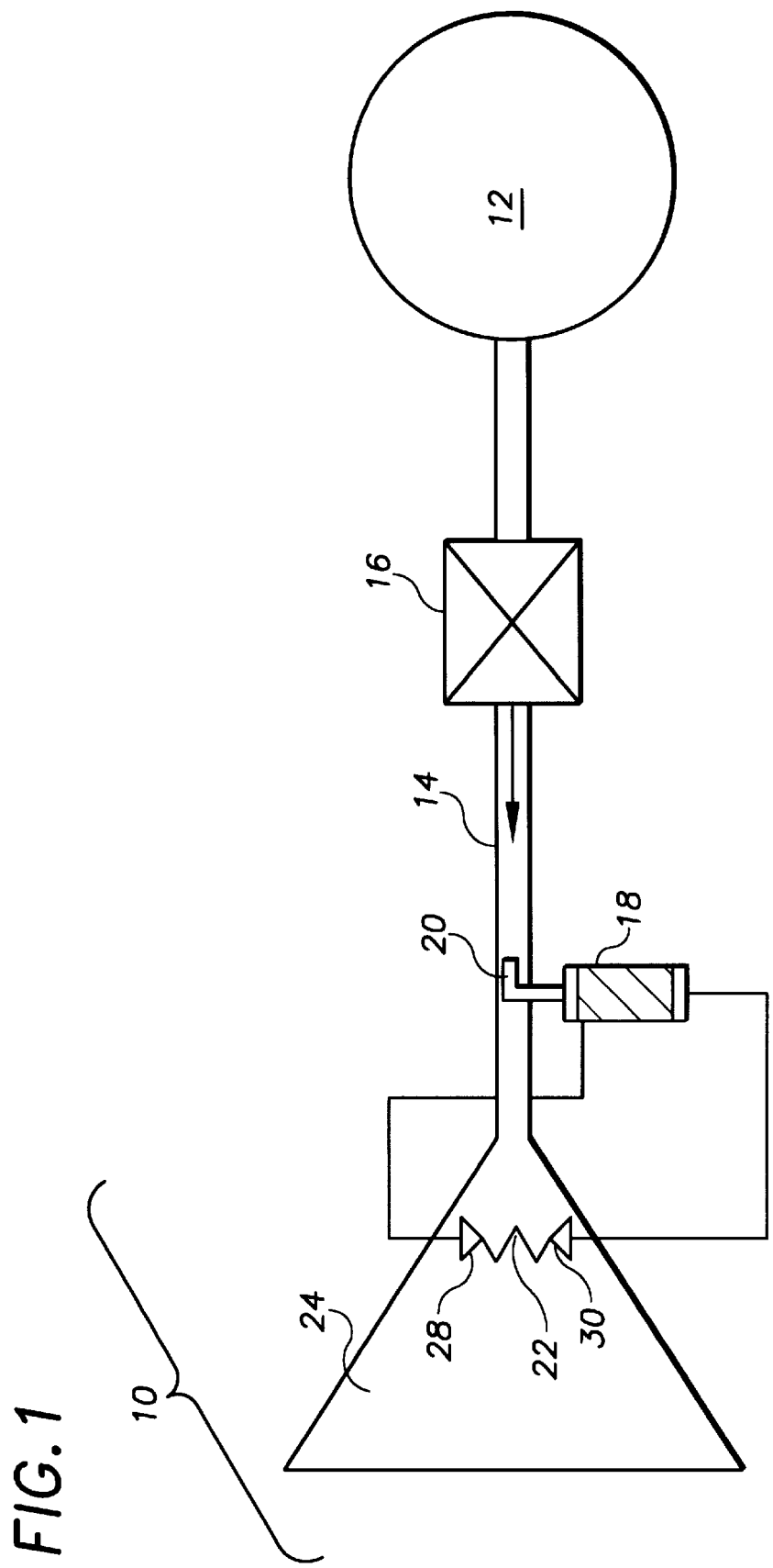
FIG. 1 depicts the integration of the piezoelectric chemical ignition device in a propellant system.
Figure 2:
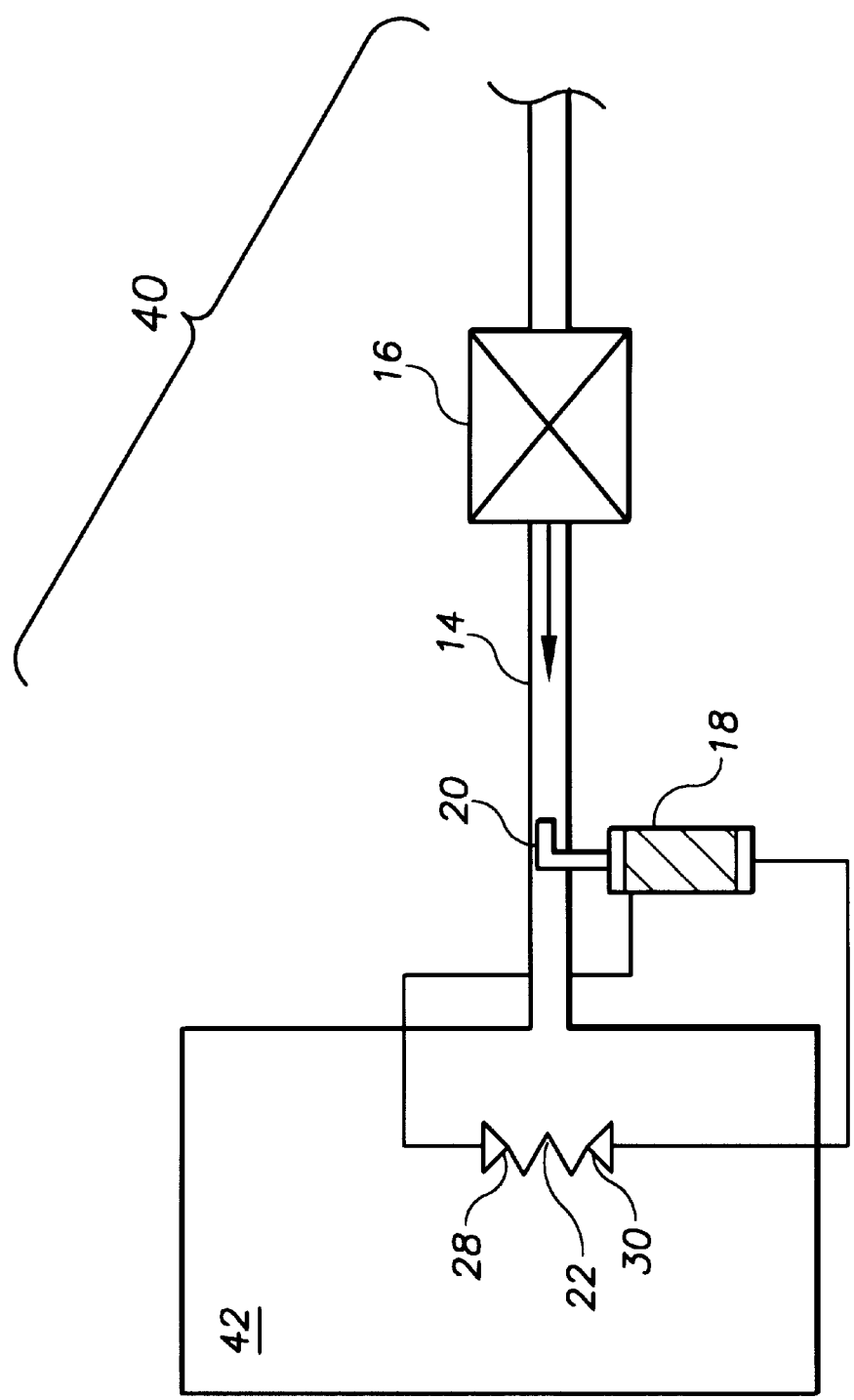
FIG. 2 depicts the integration of the piezoelectric chemical ignition device in a generalized chemical ignition process.
Figure 3:
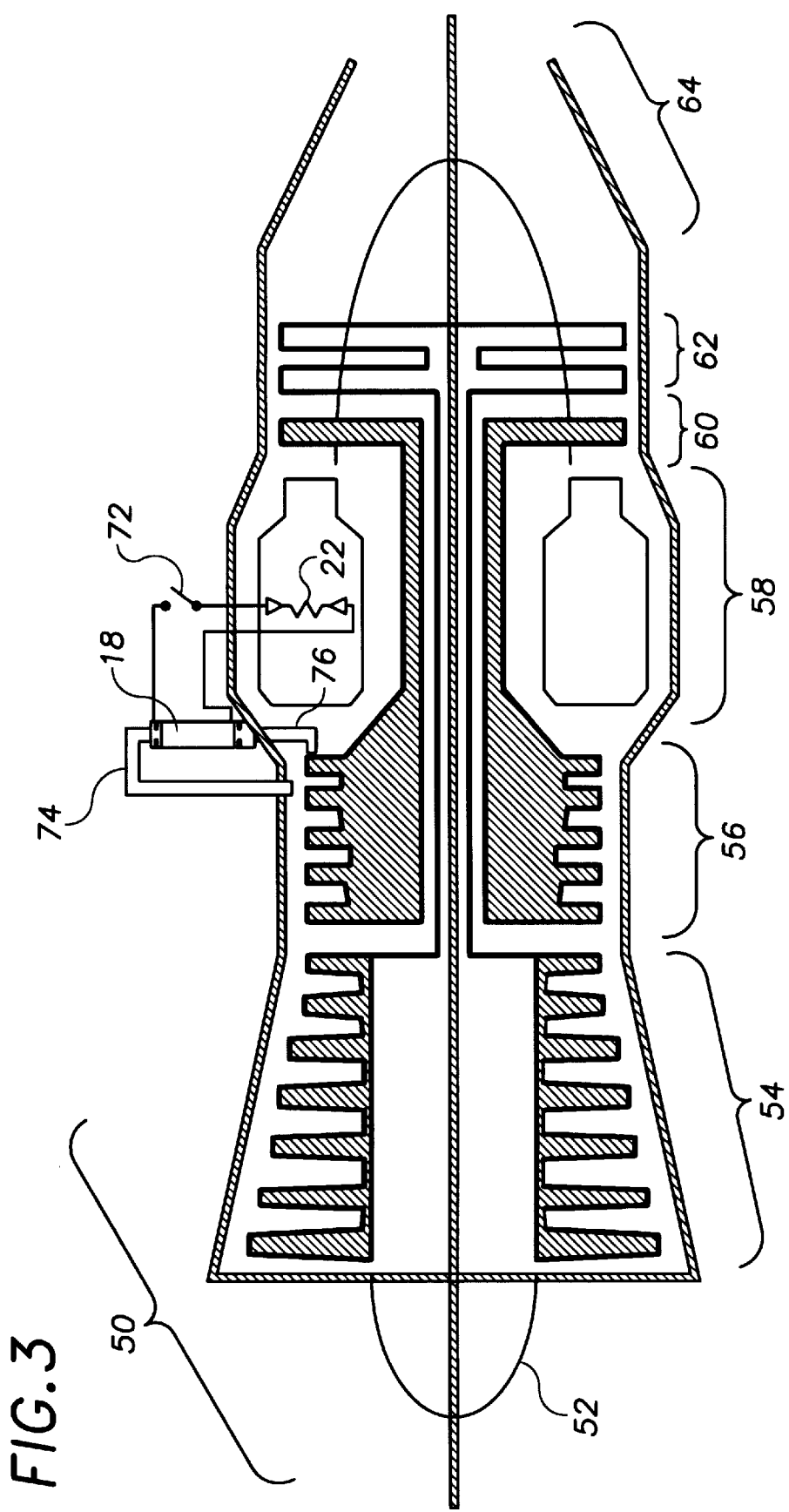
FIG. 3 depicts the integration of the piezoelectric chemical ignition device in a turbine engine.

The device can be integrated into a vast number of combustion or ignition processes. FIGS. 1 through 3 show the piezoelectric chemical ignition device integrated into several different systems, showing the versatility of the device. The device can be adapted for any system or process where there is pressure available to strain a piezoelectric element in order to initiate combustion.

This device relies on the pressure in the system for operation. The pressure is the mechanical energy that is converted into electrical energy. Thus, the system is significantly different from systems that use oscillating masses, spring loading and other striking mechanisms to generate mechanical energy. In none of the prior art igniters described above is the generation of voltage controlled by the material to be ignited. In each example, control of the voltage across the piezoelectric element is not necessarily related to control of the flow of combustible material. Correlating the voltage with the presence of the actual material to be ignited simplifies the control of these ignition and combustion systems, increasing safety while reducing design and manufacturing costs.

In the device as shown in FIGS. 1 and 2, the piezoelectric element 18 generates electrical energy in response to the increase in pressure caused by the opening of the valve 16. This implementation relies on the total pressure of the system. The device can also operate on the dynamic pressure in a system. The device reacts to changes in static, dynamic or total (static plus dynamic) pressure.

As shown in FIGS. 1 and 2, an increase in pressure in the feed line 14 of the system will produce a mechanical strain in the device. When the valve 16 opens, a combustible fluid or gas flows down the feed line 14 to the thruster 24 (FIG. 1) or combustion chamber 42 (FIG. 2). This flow has both a dynamic and static pressure associated with it. Depending on the amount of flow losses in the system, the sum of these two pressures is close to the pressure in the propellant tank or the pressure produced by a pump if one is used. The dynamic pressure may be recovered by using a pitot tube-like device 20. The following relation gives the total pressure available for the strain of the piezoelectric element:

$$P_{Total} = P_{Static} + \tfrac{1}{2}\rho V^2 \tag{1}$$

where $\rho$ is the density of the fluid or mixture of fluids and V the speed of the fluid in the feed line. The second term of Equation 1 represents the dynamic pressure sampled by the pitot tube 20.

The total pressure strains the piezoelectric element 18 and causes a charge to develop over its poles. The piezoelectric element material, size and configuration are selected so that the charge and energy produced by the piezoelectric element will be sufficient to ignite the combustible liquid in the system.

In other designs, it might be feasible to remove the static pressure in order to lower the mean stress in the system and simplify the design, as shown in FIG. 3. Here, both ends of the piezoelectric element 18 are subjected to the static pressure. Only the dynamic pressure actuates the piezoelectric element.

First Order Model

The model that will be described here deals with the axial loading of a piezoelectric element. There are a vast number of configurations and load conditions that will cause a piezoelectric element to generate the electrical energy required to ignite liquids. For simplicity, only the model of an axial loading of an element in the z direction is described. It will be evident to one skilled in the art that the piezoelectric constants can be described with respect to a variety of loading directions.

A piezoelectric element generates a voltage over its poles when strained. In an axially loaded configuration, this voltage is directly proportional to the stress in the element and is influenced only by the length of the element and the material's piezoelectric constant. The relationship between these factors is given by the following equation:

$$V = \sigma g_{33} l \tag{2}$$

where $\sigma$ is the stress applied to the element, $g_{33}$ the piezoelectric voltage constant in the axial direction and l the length of the element. The charge developed by an axially loaded element in the z direction is given by the formula:

$$Q = F d_{33} \tag{3}$$

where Q is the charge developed, F the force on the piezoelectric element, and $d_{33}$ the piezoelectric strain constant in the z direction. The electrical energy produced by the element is a function of the mechanical energy transferred to the piezoelectric element. The electric energy is given by:

$$E_{Electric} = k_{33} E_{Mechanical} = \tfrac{1}{2} k_{33} K_{Element} \Delta x^2 \tag{4}$$

where $k_{33}$ is the mechanical to electrical energy conversion factor, $\Delta x$ the deflection caused in the z direction by the force on the element, and $K_{Element}$ the related spring constant of the piezoelectric element (IEEE Standard 176-1978, *IEEE Standard on Piezoelectricity.* 1978, The Institute of Electric and Electronic Engineers). The spring constant can be defined by $$K_{Element} = \frac{A \cdot E}{l} \tag{5}$$

where A, E, and l are the cross-sectional area, Young's modulus, and length of the piezoelectric element, respectively.

The voltage, charge and energy produced is thus directly proportional to the force on the element and the size of the element. It is thus possible to configure and size the device such that the force on the element will be sufficient to produce the required energy for ignition.

This model represents an axial strain configuration of the piezoelectric element. This is not the only configuration possible. It might be desirable to bend or shear the piezoelectric material in order to generate the required energy for ignition.

EXAMPLES

Exemplary chemical processes that may utilize the device include but are not limited to the following:

Refinery/processing plants
Oil & gas production facilities
Emergency relief systems
Hot water system burners
Solid waste incinerators
SRU reaction furnaces
Portable flares
Oil well testing
Glycol dehydration vents
Storage tank vents
Furnace/heater burners
Steam boiler burners
Gas/liquid incinerators Pit flares
Elevated flares
Pipeline vents
Propane barbecues
Gas stoves FIG. 1 shows the piezoelectric chemical ignition device integrated into a typical propellant system 10. Opening of the valve 16 causes the propellant to flow down the feed line 14 towards the nozzle. The propellant is stored under pressure in a tank 12 or is fed with a pump. A pitot tube-like device 20 is placed in the feed line 14 just before the thruster 24. The dynamic pressure of the propellant due to its flow rate plus the static pressure will be sensed by the pitot tube 20. This pressure will cause the piezoelectric element 18 to strain, thereby generating a charge. The charge is relayed to the igniter 22 that is positioned in the ignition chamber of the thruster 24. When the potential over the igniter electrodes 28 and 30 reaches the designed value, a spark will be generated over the electrodes 28 and 30 and ignite the propellant.

When the valve 16 is closed, the flow will stop, pressure on the piezoelectric element 18 will be relieved, and it will return to its original shape. When the valve 16 is opened again, the process will be repeated.

FIG. 2 shows the device integrated into a typical chemical combustion furnace 40. The operation is essentially the same as for the propellant igniter. Here a combustible fluid (gas or liquid) or mixture of fluids enters the furnace 42 through a valve 16. As the valve 16 is opened, the pressure in the line 14 strains the piezoelectric element 18 as described earlier. The strain causes a charge to be developed. When the charge is high enough for combustion, the spark propagates over the igniter's 22 electrodes 28 and 30 and combustion is achieved in the furnace 42. The device essentially eliminates the need for a pilot flame that is currently used in many chemical processes.

Figure 3A:
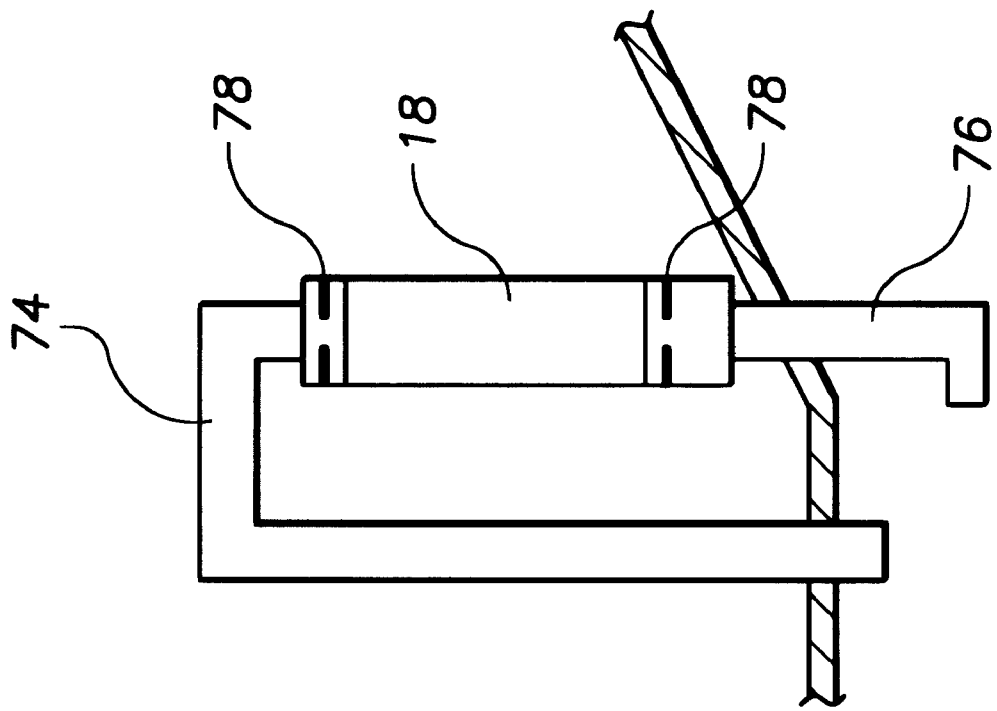
FIG. 3a provides a larger scale view of the piezoelectric chemical ignition device as shown in FIG. 3.

In a gas turbine engine, it is required that an intermittent spark (on the order of once per second) is generated under humid inlet conditions to ensure combustion stability. Currently, this spark is generated by a complicated exciter which requires extra electronics for control of the spark release. FIG. 3 shows how the piezoelectric chemical ignition device can be integrated into a gas turbine engine 50. Air enters the engine through an inlet 52 and passes through a low-pressure compressor 54. Further compression occurs in the high-pressure compressor 56 before the air passes into the combustor 58. Exhaust passes through the high pressure turbine (HPT) 60 and low pressure turbine (LPT) 62 before exiting the engine through the nozzle 64. The device relies on the fluctuation of the dynamic pressure in a turbine engine. FIGS. 3 and 3a show the total pressure tube 76 installed just after the last rotor in the high-pressure compressor 56. The pitot tube 76 senses the total pressure of the system, and this pressure acts on the one side of the piezoelectric element 18, which is retained with retainers 78. The static pressure acts on the other side of the piezoelectric element 18 through the static pressure tube 74. The difference in these two pressures equals the dynamic pressure in the last compressor stage. By retaining the piezoelectric element 18 as shown, the element is strained by the dynamic pressure only. According to the piezoelectric effect, this results in the generation of a charge that is proportional to the dynamic pressure.

The dynamic pressure in the compression stage of a turbine engine has a cyclic fluctuation equal to 10% of the total pressure at that specific point. The fluctuation causes a fluctuation in the voltage/charge output from the piezoelectric element 18. This fluctuation will cause multiple sparks in the igniter 22 when the switch 72 is closed. The turbine engine controller (not shown) can be used to operate the switch 72.

In all of these examples, the release of the electrical energy generated by the piezoelectric element can be controlled as shown in FIG. 3. Here, the turbine engine controller closes a switch 72 in order to create the spark required for ignition. The energy generated by the piezoelectric element 18 can also be stored in a capacitor, allowing for ignition delay as required by some systems.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. An ignition device for a combustion system, comprising:
    a piezoelectric element, wherein the element generates electrical energy in response to pressure;
    means for introducing a combustible material into a combustion chamber such that a change in the amount of the material being introduced results in a change in pressure exerted on the piezoelectric element; and
    an igniter electrically coupled to the piezoelectric element.

2. The ignition system of claim 1, wherein the electrical energy is sufficient to induce the igniter to ignite the combustible material.

3. The ignition system of claim 2, wherein the combustible material comprises a member of the group consisting of a combustible liquid, a combustible gas, a combustible mixture of liquids, a combustible mixture of gases, and combustible mixtures thereof.

4. The ignition system of claim 3, wherein the electrical circuit further comprises a capacitor in series with the igniter.

5. The ignition system of claim 3, wherein the electrical circuit further comprises:
    a switch; and
    a controller for the switch, wherein by opening and closing the switch, the controller controls the conduction of the electrical energy to the igniter.

6. The ignition system of claim 5, wherein the electrical circuit further comprises a capacitor in series with the igniter.

7. The ignition system of claim 1, wherein the combustible material is a propellant for space propulsion.

8. The ignition system of claim 1, wherein the electrical energy ignites a chemical combustion process.

9. The ignition system of claim 1, wherein the electrical energy ignites fuel for a turbine engine.

10. A combustion process, comprising:
    a feedline whereby a combustible material may be introduced into a chamber;
    means to increase the pressure on a piezoelectric element in response to the introduction of the combustible material;
    wherein, in response to the increased pressure, the piezoelectric element generates enough electrical energy to ignite the combustible material; and
    means for conducting the electrical energy to an igniter, whereat the combustible material is ignited.

11. The process of claim 10, further comprising means for controlling the conduction of the electrical energy to the igniter.

12. A method of igniting a combustible material, comprising:

introducing a combustible material;

applying pressure on a piezoelectric element in response to the introduction of the combustible material;

wherein, in response to the increased pressure, the piezoelectric element generates enough electrical energy to ignite the combustible material; and conducting the electrical energy to an igniter, whereat the combustible material is ignited.

13. The method of claim 12, further comprising controlling the conduction of the electrical energy to the igniter.

* * * * *

UNITED STATES PATENT AND TRADEMARK OFFICE
CERTIFICATE OF CORRECTION

PATENT NO. : 6,199,365 B1
DATED : March 13, 2001
INVENTOR(S) : Jacob van Reenen Pretorius and Marthinus Cornelius van Schoor It is certified that error appears in the above-identified patent and that said Letters Patent is hereby corrected as shown below:

<u>Column 1,</u>
Line 3, add -- This invention was partially made with Government support under Contract Number F04611-99 C-0045 awarded by the United States Air Force. The United States Government has certain rights in this invention. --

Signed and Sealed this

Twentieth Day of August, 2002

*Attest:*

*Attesting Officer*

JAMES E. ROGAN
*Director of the United States Patent and Trademark Office*